United States Patent
Oh et al.

(10) Patent No.: US 8,325,291 B2
(45) Date of Patent: Dec. 4, 2012

(54) DISPLAY DEVICE HAVING A FIXING PROJECTIONS AND FIXING HOLES FOR COUPLING MECHANISM BETWEEN FRAMES

(75) Inventors: Young-Rok Oh, Cheonan-si (KR); Won-Seok Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 400 days.

(21) Appl. No.: 12/625,526

(22) Filed: Nov. 24, 2009

(65) Prior Publication Data

US 2010/0302717 A1 Dec. 2, 2010

(30) Foreign Application Priority Data

Jan. 22, 2009 (KR) ........................ 10-2009-0005673

(51) Int. Cl.
*G02F 1/1333* (2006.01)
*G02F 1/1335* (2006.01)

(52) U.S. Cl. ................. 349/58; 349/59; 349/60; 349/62; 345/87

(58) Field of Classification Search .............. 349/58–62; 345/87
See application file for complete search history.

(56) References Cited

U.S. PATENT DOCUMENTS

| | | | |
|---|---|---|---|
| 5,729,310 A | 3/1998 | Horiuchi et al. | |
| 6,762,806 B1 | 7/2004 | Matsuo et al. | |
| 6,835,961 B2 * | 12/2004 | Fukayama | 257/84 |
| 8,059,227 B2 * | 11/2011 | Shin | 349/58 |
| 2002/0105605 A1 | 8/2002 | Huang et al. | |
| 2004/0183957 A1 | 9/2004 | Han | |
| 2006/0290833 A1 * | 12/2006 | Park | 349/58 |
| 2006/0290836 A1 * | 12/2006 | Chang | 349/58 |
| 2010/0142178 A1 * | 6/2010 | Yee et al. | 361/829 |
| 2011/0007230 A1 * | 1/2011 | Yamamoto et al. | 348/794 |

FOREIGN PATENT DOCUMENTS

| | | |
|---|---|---|
| JP | 2005-315901 | 11/2005 |
| KR | 10-2004-0035122 A | 4/2004 |
| KR | 10-2007-0048018 A | 5/2007 |
| KR | 10-2007-0071331 A | 7/2007 |
| KR | 10-2008-0049888 A | 6/2008 |

OTHER PUBLICATIONS

European Search Report for corresponding EP Application No. 09 01 6159 dated Mar. 24, 2010 (7 pages).

* cited by examiner

*Primary Examiner* — Huyen Ngo
(74) *Attorney, Agent, or Firm* — Innovation Counsel LLP

(57) ABSTRACT

A display device capable of minimizing the width of a bezel is presented. The display device includes a display panel displaying an image; a first frame having a first surface configured to support the display panel and a second surface on which a first coupling mechanism is formed; a second frame having a second coupling mechanism and engaged with the first frame; an optical member interposed between the first frame and the second frame; a receptacle including four side-wall parts and a bezel part extended from the side-wall parts to an inside thereof, and receiving the display panel, the first frame, and the second frame therein, wherein the first coupling mechanism and the second coupling mechanism comprise a first fixing projections and a first fixing holes into which the first fixing projections are inserted.

36 Claims, 13 Drawing Sheets

DISPLAY DEVICE HAVING A FIXING PROJECTIONS AND FIXING HOLES FOR COUPLING MECHANISM BETWEEN FRAMES

CROSS-REFERENCE TO RELATED APPLICATIONS

This application is based on and claims priority from Korean Patent Application No. 10-2009-0005673 filed on Jan. 22, 2009, in the Korean Intellectual Property Office, the disclosure of which is incorporated herein in its entirety by reference.

BACKGROUND

1. Technical Field

Embodiments of the present invention generally relate to a display device and, more particularly, to a display device having a structure that may minimizes the width of a bezel part so that a plurality of display devices may be connected together to constitute a multi-display device.

2. Related Art

With the development of modern society as an information society, large-sized and thin display devices are in demand in the market. Since conventional CRT devices cannot fully satisfy such demand, calls for flat display devices represented, for example, by a plasma display panel (PDP), a plasma address liquid crystal display panel (PALC display panel), a liquid crystal display (LCD), and an organic light emitting diode (OLED), and the like, are explosively increasing.

The liquid crystal display (LCD) is a display device having advantages, for example, of low power consumption and small size, and has been widely used, for example, in the computer industry, electronic industry, and information & communications industry. The liquid crystal display typically includes a liquid crystal panel assembly provided with a liquid crystal panel for displaying image information, a backlight assembly provided with a light emitting device and a light guide plate guiding emitted light toward the liquid crystal panel, and a receptacle receiving the liquid crystal panel assembly and the backlight assembly therein.

Recently, with the demand for a large-screen liquid crystal display, there has been an increasing interest in a multiple liquid crystal display having a plurality of liquid crystal display units joined together.

A multi-display device provides a large display screen by joining a plurality of display devices in the form of a matrix. With the typical multi-display device, non-display areas are formed on the screen due to the receptacles of the respective display devices. The non-display areas formed on the screen may distort an image being displayed on the screen, and may detract from viewing pleasure. Accordingly, in order to reduce the non-display areas on the screen, a structure that can minimize the bezel area of the display device is sought.

Accordingly, there is a need for a structure to minimize the width of a bezel area of a display device and, as a receptacle forming a frame of the display device, to maintain stiffness.

SUMMARY

Accordingly, embodiments of the present invention have been made to solve the above-mentioned problems occurring in the prior art, and embodiments of the present invention may provide a display device having a structure that minimizes (e.g., reduces) the width of a bezel part so that a plurality of display devices may be connected together to constitute a multi-display device.

Additional advantages, objects, and features of embodiments of the invention will be set forth in part in the description which follows and in part will become apparent to those having ordinary skill in the art upon examination of the following or may be learned from practice of the invention.

In one or more embodiments of the present invention, there is provided a display device, which includes a display panel that displays an image; a first frame having an upper surface on which the display panel is seated and a lower surface including first fixing projections; and a second frame engaged with the first frame and including fixing holes into which the first fixing projections are inserted.

BRIEF DESCRIPTION OF THE DRAWINGS

The above and other objects, features, and advantages of embodiments of the present invention will be more apparent from the following detailed description taken in conjunction with the accompanying drawings, in which.

DETAILED DESCRIPTION

Figure 1:
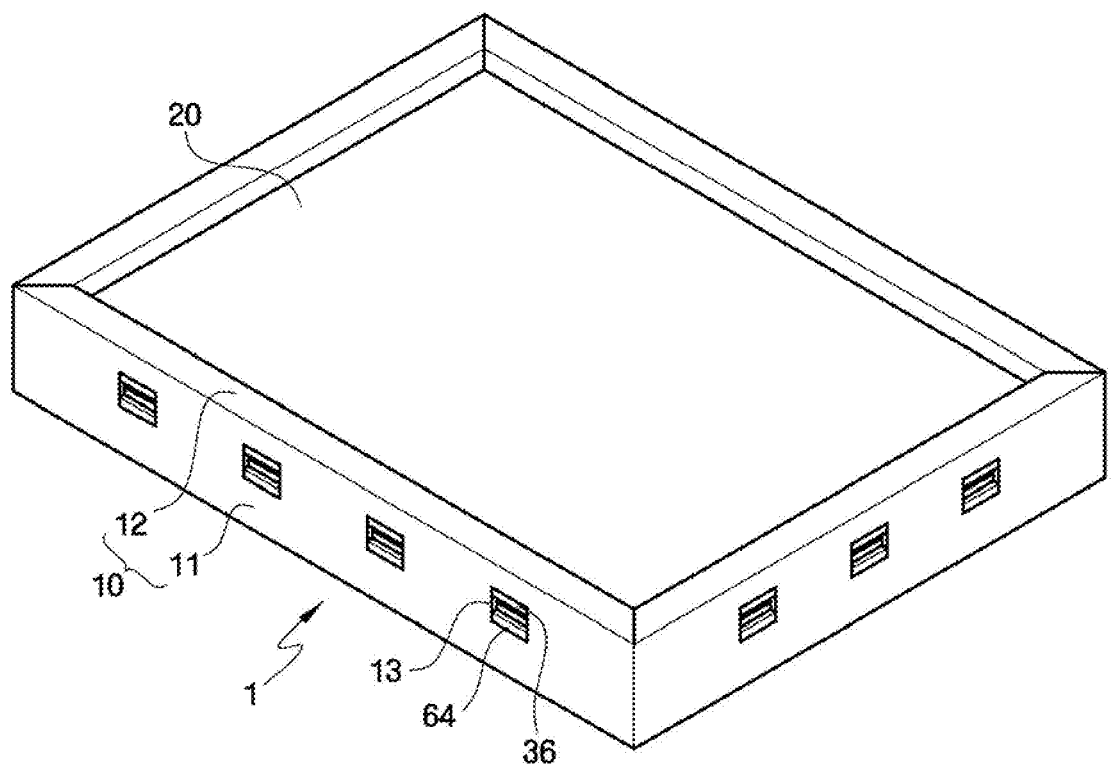
FIG. 1 is a perspective view of a display device according to a first embodiment of the present invention.

Hereinafter, embodiments of the present invention will be described in detail with reference to the accompanying drawings. The aspects and features of embodiments of the present invention and methods for achieving the aspects and features will be apparent by referring to the embodiments to be described in detail with reference to the accompanying drawings. The present invention is not limited, however, to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of embodiments of the present invention, the same drawing reference numerals are used for the same elements across various figures.

Spatially relative wordings "below", "beneath", "lower", "above", "upper", and so forth, as illustrated in the drawings, may be used to facilitate the description of relationships between an element or constituent elements and another element or other constituent elements. The spatially relative wordings should be understood as wordings that include different directions of the element in use or operation in addition to the direction illustrated in the drawings.

Figure 2:
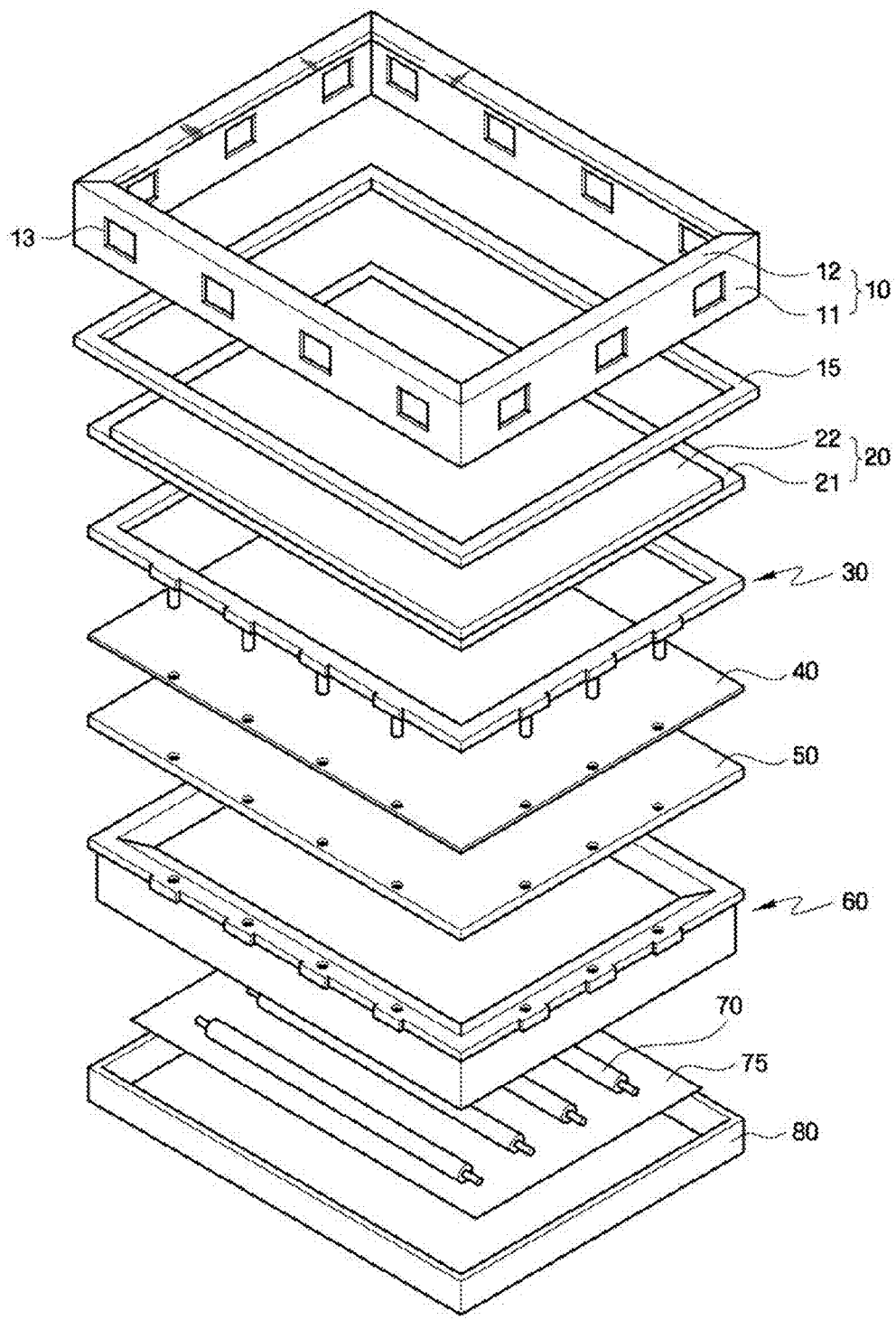
FIG. 2 is an exploded perspective view of the display device of FIG. 1 in accordance with an embodiment.

Hereinafter, with reference to FIGS. 1 and 2, a display device according to a first embodiment of the present invention will be described in detail. FIG. 1 is a perspective view of a display device according to a first embodiment of the present invention, and FIG. 2 is an exploded perspective view of the display device of FIG. 1 in accordance with an embodiment.

A display device 1 according to the first embodiment of the present invention includes a display panel 20 to display an image, and a backlight assembly to provide light to the display panel 20. The display panel 20 and the backlight assembly are received in an upper receptacle 10 and a lower receptacle 80. In the center part of the upper receptacle 10, an open window for exposing the display panel 20 therethrough is formed. The upper receptacle 10 is formed to increase the exposed area of the display panel 20 to a maximum while maintaining the stiffness enough to maintain the frame of the display device 1. Hereinafter, the structure of the display device 1 will be described in detail.

The display panel 20 serves to display an image, and includes a lower substrate 21, an upper substrate 22, and a liquid crystal layer (not illustrated) interposed between the two substrates 21 and 22. The lower substrate 21 may include gate lines (not illustrated), data lines (not illustrated), a thin film transistor array, and pixel electrodes, for example, and the upper substrate 22 may include color filters, black matrices, and common electrodes, for example. The color filters and the common electrodes, for example, may be formed on the lower substrate 21.

In the following description of an embodiment of the present invention, a liquid crystal panel including a liquid crystal layer will be described as a concrete example of the display panel 20. However, the display panel 20 is not limited thereto, and has a structure that may be used in all display devices using a flat type display panel 20. That is, the display device described in the description has a structure that may reduce the non-display area of the display device and extend the display area by sufficiently maintaining the stiffness of the display device. By using this structure, the valid screen (e.g., image-displaying portion of the screen) is increased, and the construction of the multi-display device is facilitated as well. The construction of the display device according to an embodiment of the present invention will be described later.

Referring to FIG. 2, components of the display device 1 will be described in detail. The upper receptacle 10 forms an external appearance of the display device 1, and has a space formed therein to receive the display panel 20. In the center part of the upper receptacle 10, an open window for exposing the display panel 20 to an outside of the upper receptacle 10 is formed. The upper receptacle 10 includes four side-wall parts 11 formed on sides thereof, and a bezel part 12 extended from the four side-wall parts to the inside of the receptacle. The thicknesses of the four side-wall parts and the bezel part 12 of the upper receptacle greatly affect the size of the display device 1, and thus it is preferable to make them as small as possible. On the other hand, the side-wall parts 11 and the bezel part 12 are important parts in maintaining the whole stiffness of the display device 1, and thus it is required for the parts to maintain sufficient stiffness. The shapes of the side-wall part 11 and the bezel part 12 will be described later.

The upper receptacle 10 is engaged with the lower receptacle 80, and the display panel 20, an optical sheet 40, a diffusion plate 50, and light sources 70 are accommodated between the upper receptacle 10 and the lower receptacle 80. In order to support the accommodation of the display panel 20, the optical sheet 40, and the diffusion plate 50, the display device may further include a first frame 30 and a second frame 60. The structure including, for example, the optical sheet 40, the diffusion plate 50, and the light sources 70 may be called a backlight assembly. In other words, the backlight assembly may refer to components that provide light to the display panel 20 in the form of surface light sources.

The display device according to an embodiment of the present invention includes a direct downward type backlight assembly in which the light sources 70 are positioned on the direct downward surface of the display panel 20. The light source may be in the form of a line light source, such as a cold cathode fluorescent lamp (CCFL), a hot cathode fluorescent lamp (HCFL), or an external electrode fluorescent lamp (EEFL).

Lamps may be successively arranged at predetermined intervals, and may be of a direct downward type. In order to obtain uniform luminance by making the distribution of discharge gas in the lamp uniform, it is preferable that the lamps are arranged in a horizontal direction against the display panel 20. At an end of the lamp, a socket 71 (see FIG. 5) for supporting and fixing the lamp and providing a lamp driving voltage to the lamp is formed.

As the light source 70, not only a fluorescent lamp in the form of a line light source but also a light emitting diode (LED) in the form of a point light source may be used. The light emitting diodes may be successively arranged at predetermined intervals on a printed circuit board. Since the light emitting diode has a structure that has a high luminance and is small-sized in comparison to the fluorescent lamp, the light emitting diode may be advantageous in fabricating an ultra slim display device. Light emitting diodes emit red light, green light, and blue light, respectively, to heighten the color purity, and thus a high-quality image may be obtained through the display device. Also, since the red light, the green light, and the blue light can be respectively controlled, it is easy to adjust the color temperature of the light source, and thus a display device capable of presenting color more plenteously may be implemented.

According to the display device 1 including the direct downward type backlight assembly according to embodiments of the present invention, the light sources 70 are uniformly distributed on the bottom surface of the lower receptacle 80, and the diffusion plate 50 is arranged just on the light sources 70. The diffusion plate 50 serves to diffuse light incident from the light sources 70, and to provide light having uniform luminance to the display panel 20. More specifically, the light sources 70 are distributed in the form of line light sources or point light sources, and emit light having non-uniform luminance on the basis of the whole surface overlapping the display panel 20. Specifically, the light luminance is high around the light source 70, and the light luminance is low in a space between the light sources 70, so that the luminance becomes non-uniform. The diffusion plate 50 diffuses the non-uniform light in diverse directions to reduce the non-uniformity of the luminance.

The diffusion plate 50 may be formed as a light-transparent resin layer to which diffuser is added. The diffuser may include any or all of, for example, a silicon diffuser, a magnesium diffuser, or calcium oxide, and the like. The light-transparent resin layer may include, for example, any or all of poly methyl methacrylate (PMMA), methyl styrene (MS), poly styrene (PS), or poly carbonate (PC), and the like.

The optical sheet 40 is arranged on the upper part of the diffusion plate 50, and serves to diffuse and condense light being transferred from the light sources 70. The optical sheet 40 may include, for example, any or all of a diffusion sheet, a first prism sheet, or a second prism sheet, and the like. The diffusion sheet is positioned on an upper part of the light sources 70, and serves to improve the luminance uniformity of light incident from the light sources 70. The first prism sheet is positioned on the upper part of the diffusion sheet, and on one surface of the first prism sheet, triangular prism shaped prism patterns (not illustrated) for condensing and emitting light diffused by the diffusion sheet are formed with specified arrangement. The second prism sheet is a multilayer-structured reflective polarization prism sheet positioned on the upper part of the prism sheet to condense and polarize the light. However, if the luminance and the viewing angle can be sufficiently secured with the first prism sheet, the second prism sheet may be excluded. The optical sheet 40 may be changed in diverse form in accordance with the specification of the backlight assembly.

The optical sheet 40 may include one or more of a diffusion sheet, a prism sheet, and a protection sheet, and have a composite function thereof. That is, the lower part of the optical sheet 40 is formed to have a diffusion function, the upper part thereof has a prism pattern (not illustrated) formed thereon, and a protection layer (not illustrated) is formed on the prism pattern. Since the optical sheet 40 has all functions including the diffusion function and the prism function, the number of components of the display device may be reduced to implement a slim display device.

The diffusion plate 50 and the optical sheet 40 are fixed to the first frame 30 and the second frame 60, respectively, and are received in the upper receptacle 10 and the lower receptacle 80. The first frame 30 and the second frame 60 form seating surfaces of the display panel 20, safely receive the diffusion plate 50 and the optical sheet 40, and reinforce the stiffness of the display device 1. The structure of the first frame 30 and the second frame 60 will be described in more detail later. The components having optical functions, such as the optical sheet 40 and the diffusion plate 50 are called optical members.

A reflection sheet 75 is installed on the lower part of the light sources 70 to reflect the light emitted from the light sources 70 to an upper part of the light sources 70. The reflection sheet 75 may be made of a material which has a good elasticity and superior reflectivity, and is of a thin type. For example, the reflection sheet 75 may be made of polyethylene terephtalate (PET). Also, the reflection sheet 75 may be formed by coating a reflection film for heightening the light reflectivity of the thin type material having a good elasticity. Also, the reflection sheet 75 may be formed in a body on the bottom surface of the lower receptacle 80. That is, the lower receptacle 80 may be made of a material having a high reflectivity, such as aluminum or aluminum alloys, and in this case, the lower receptacle itself may perform the function of the reflection sheet 75.

The lower receptacle 80 is in the form of a rectangle, and has side walls formed along the edge of the upper surface thereof, in which the optical sheet 40, the diffusion plate 50, the light sources 70, and the reflection sheet 75 are accommodated and fixed.

Figure 3:
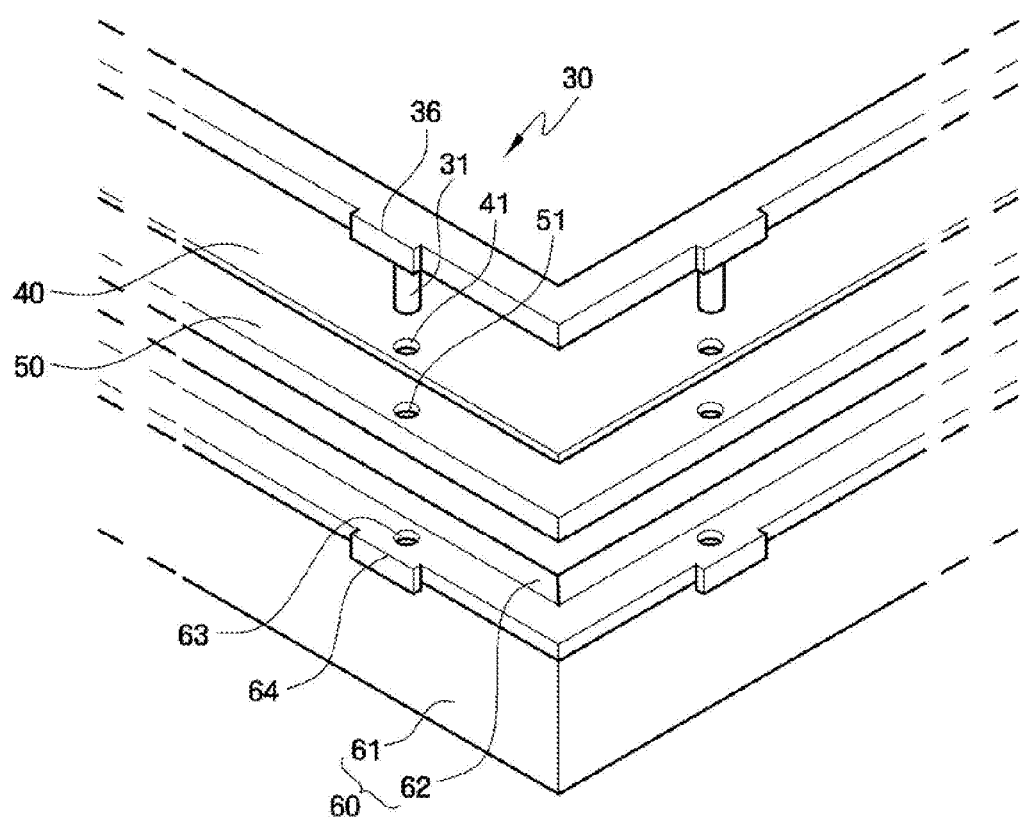
FIG. 3 is a partial exploded perspective view explaining engagement of a first frame and a second frame included in the display device of FIG. 1 in accordance with an embodiment.
Figure 4:
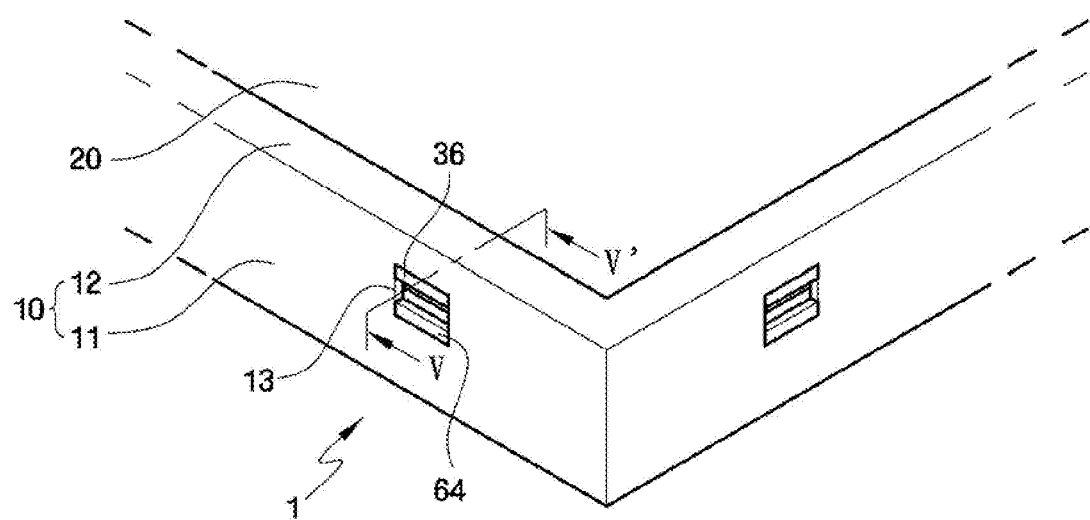
FIG. 4 is a partial perspective view of the display device of FIG. 1 in accordance with an embodiment.
Figure 5:
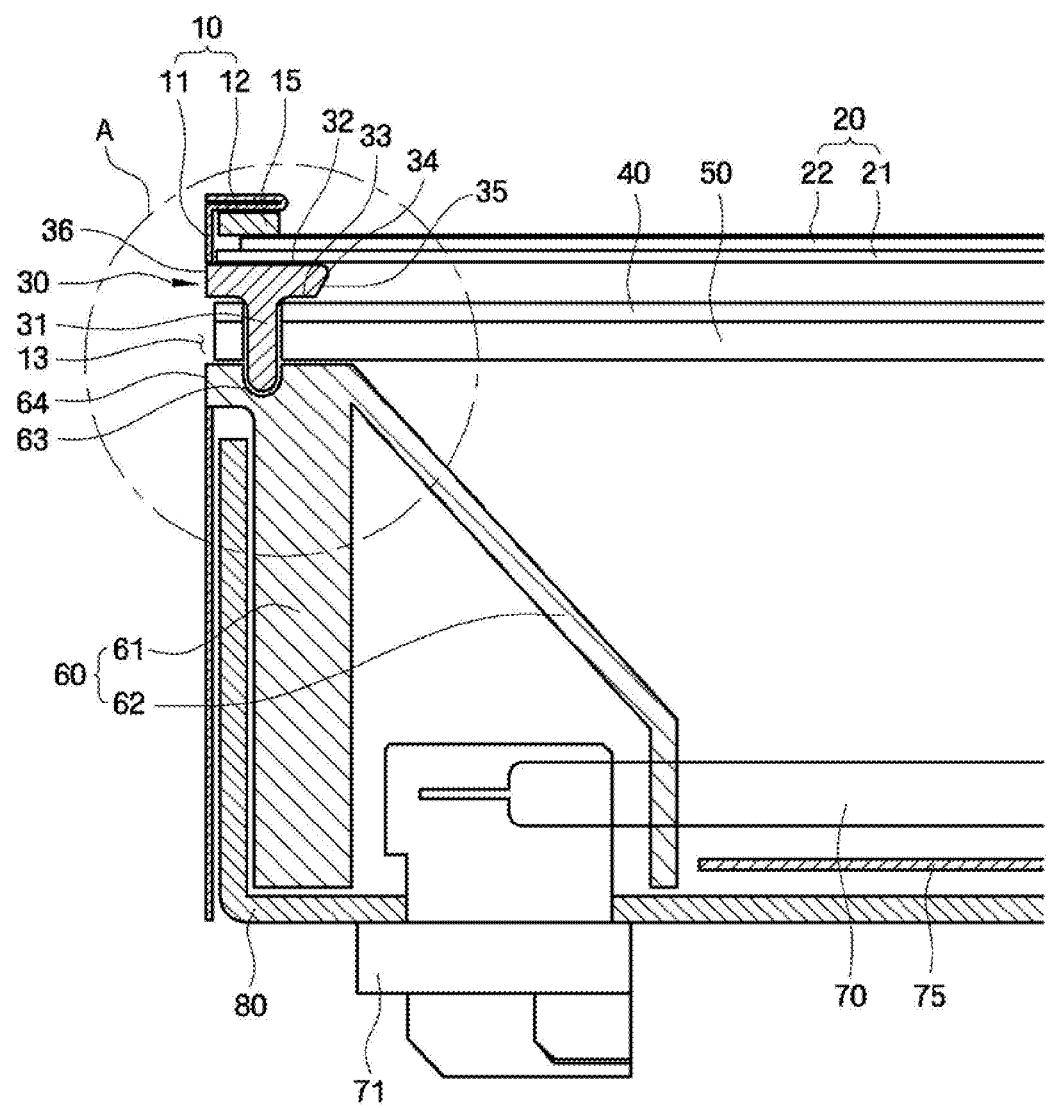
FIG. 5 is a sectional view of the display device, taken along line V-V' in FIG. 4 in accordance with an embodiment.
Figure 6:
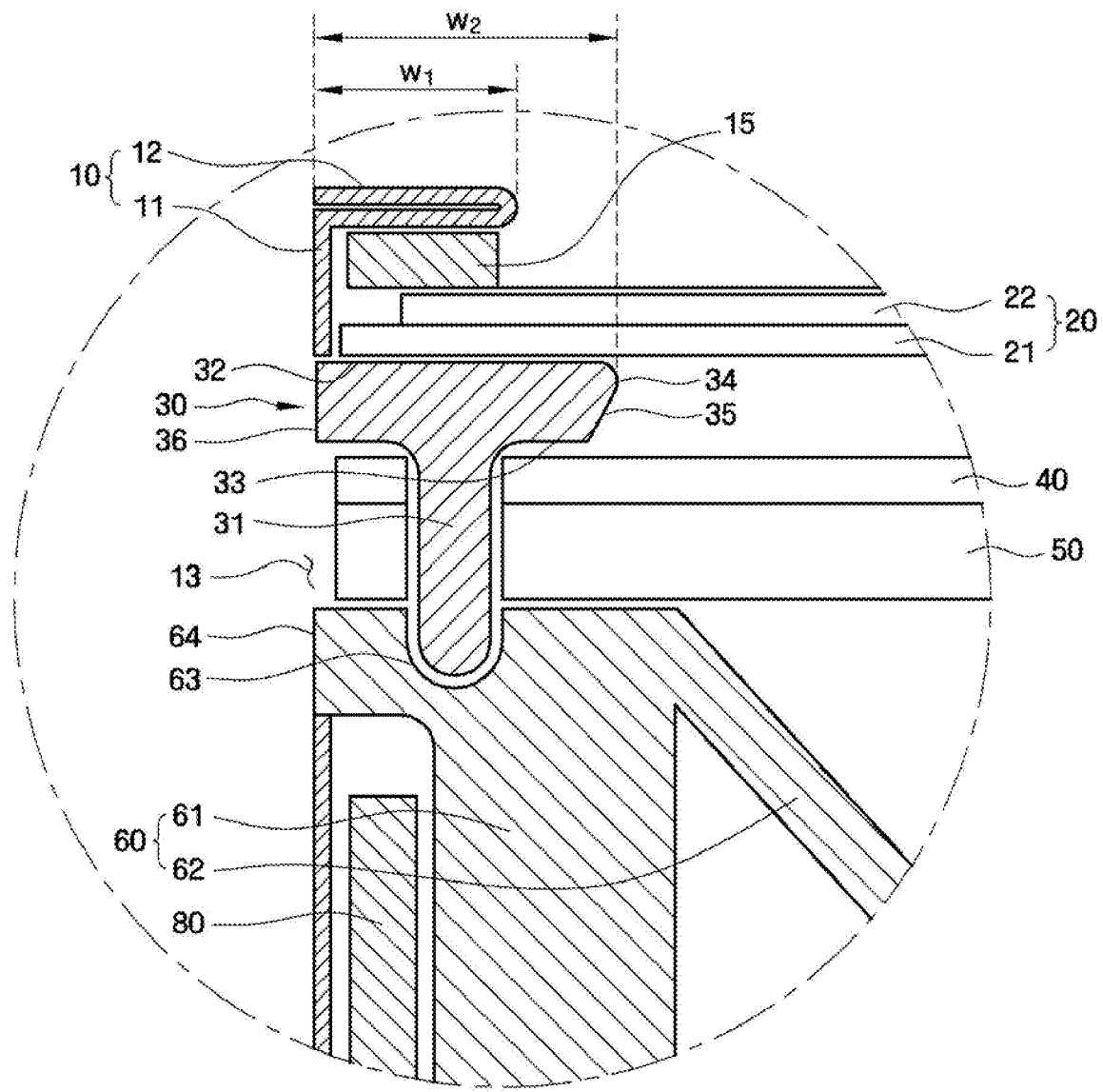
FIG. 6 is an enlarged sectional view of area "A" in FIG. 5 in accordance with an embodiment.

Hereinafter, with reference to FIGS. 3 to 6, the upper receptacle 10, the first frame 30, and the second frame 60 included in the display device 1 according to the first embodiment of the present invention will be described in detail. FIG. 3 is a partial exploded perspective view, in accordance with an embodiment, explaining engagement of a first frame and a second frame included in the display device of FIG. 1, and FIG. 4 is a partial perspective view, in accordance with an embodiment, of the display device of FIG. 1. FIG. 5 is a sectional view, in accordance with an embodiment, of the display device, taken along line V-V' in FIG. 4, and FIG. 6 is an enlarged sectional view, in accordance with an embodiment, of area "A" in FIG. 5.

Referring to FIG. 3, the optical sheet 40 and the diffusion plate 50 are fixed between the first frame 30 and the second frame 60. A first fixing projection 31 formed on the first frame 30 serves to fix the optical sheet 40 and the diffusion plate 50 and to fix the first frame 30 and the second frame 60.

The first frame 30 forms seating surfaces of the display panel (See "20" in FIG. 2). The first frame 30 includes the first fixing projection 31, and fixes the optical sheet 40 and the diffusion plate 50. The first frame 30 may be in the form of a tetragon having an open center part that forms an inner side surface thereof so that the first frame overlaps the edge of the display panel 20. However, the shape of the first frame 30 is not limited to the tetragon, and the first frame 30 may be formed on one side or both sides of the edge of the display panel 20 as needed.

In addition, since the first frame 30 is formed to overlap the display panel 20, it may be formed of a transparent material so that it is not visually recognized. The transparent material may be a plastic series transparent material such as poly methyl methacrylate (PMMA). As described above, by forming the first frame 30 with a transparent material, the first frame 30 may be prevented from being visually recognized as a dark part on the display panel 20. Only a part of the first frame 30 may be formed of a transparent material. For example, a part of the first frame 30 that may be visually recognized as a dark part is formed of a transparent material, and the remaining part thereof is formed of an opaque material, so that light leakage to unnecessary parts through the first frame 30 may be prevented. The first frame 30 may be formed through injection molding, and an insert injection method may be used to form only a part of the first frame as a transparent material.

The first frame 30 includes the first fixing projection 31 formed on the lower part thereof. The first fixing projection 31 penetrates a first hole 41 formed on the optical sheet 40 and a second hole 51 formed on the diffusion plate 50, and is inserted into a fixing hole 63 of the second frame 60.

The first fixing projection 31 serves to fix the first frame 30 and the second frame 60 to each other, and to fix the optical sheet 40 and the diffusion sheet 50 to the second frame 60. A plurality of first fixing projections 31 may be formed along the four sides of the first frame 30. The diameter of the first fixing projection 31 may be adjusted in accordance with the width of the first frame 30. The size and the number of the first fixing projections 31 may be properly set to prevent the movement of the optical sheet 40 and the diffusion plate 50.

In addition, the first hole 41 and the second hole 51 may be formed on end parts of the optical sheet 40 and the diffusion plate 50, and in order to maximize the area of the surface light sources, they may be formed at the edges of the optical sheet 40 and the diffusion plate 50. If the edges of the optical sheet 40 and the diffusion plate 50 are fixed by the first fixing projection 31, it is possible to maintain a state of the optical sheet 40 and the diffusion plate 50 always having an even surface.

The second frame 60 is positioned on the lower part of the first frame 30, and forms seating surfaces of the optical sheet 40 and the diffusion plate 50. The second frame 60 may have the thickness or width greater than those of the first frame 30. The second frame 60 may include four wall surfaces 61 and inclined surfaces 62 extended from the wall surfaces. The four wall surfaces 61 may serve to maintain the stiffness of the second frame 60, and the inclined surfaces 62 may serve to reflect the light of the light sources 70 to an upper side.

The first frame 30 and the second frame 60 include a first frame extension part 36 and a second frame extension part 64 projecting to an outside, respectively. Referring to FIGS. 4 and 5, the first frame extension part 36 and the second frame extension part 64 are fixed to a first opening 13 formed on the side-wall part 11 of the upper receptacle 10. The first frame extension part 36 and the second frame extension part 64 serve to fix the first frame 30 and the second frame 60 to the upper receptacle 10, respectively.

The first frame extension part 36 and the second frame extension part 64 may be formed to have a proper size so as to prevent the first frame extension part 36 and the second frame extension part 64 from being projected to an outside of the upper receptacle 10 through the first opening 13. If the first frame extension part 36 and the second frame extension part 64 are projected to the outside of the upper receptacle 10, it may cause an obstacle in forming a multi-display device by connecting a plurality of display devices together. The optical sheet 40 and the diffusion plate 50 may be formed in the form of a tetragon without forming the projecting parts such as the first frame extension part 36 and the second frame extension part 64.

According to the structure in which the first frame 30 and the second frame 60 are fixed to the first opening 13 formed on the side-wall part 11 of the upper receptacle 10 as described above, the first frame 30 and the second frame 60 may be engaged with the upper receptacle 10 through a simple structural modification without adding any separate component.

In addition, the bezel part 12 of the upper receptacle 10 may be doubly formed to reinforce the stiffness thereof. The upper receptacle may be formed by processing a metallic plate material. The metallic material may be a thin film member formed by bending the metallic plate material. Particularly, in order to heighten the stiffness of the bezel part 12 with the width of the bezel part 12 narrowed, the bezel part 12 may be formed by folding the metallic plate material twice or more. A hemming process may be adopted to fold the metallic plate material twice or more. The bezel part 12 may be formed to expose the display area of the display panel 20 to an outside and to overlap the non-display area.

Referring to FIG. 6, the width W1 of the bezel part 12 may be smaller than the width W2 of the first frame 30. The bezel part 12 may be formed only on the non-display area of the display panel 20, but the first frame 30 may partially overlap the display area of the display panel 20. As described above, since the first frame 30 is formed of a transparent material, it may not be visually recognized as a dark part on the display panel 20 even if the first frame 30 partially overlaps the display area of the display panel. The first frame 30 may include a curved (e.g., rounded) part 34 and a straight (e.g., flat) part 35 formed on an inner surface thereof so that a part of the first frame 30 overlapping the display area is not visually recognized.

Specifically, the first frame 30 may be formed in the form of a tetragon having an open center part that forms an inner side surface thereof. The first frame 30 includes an upper surface 32 on which the display panel is seated, and a lower surface 33 which is opposite to the upper surface 32 and is in contact with the optical sheet 40. The first frame 30 also includes the curved part 34 and the straight part 35 that connects between the upper surface 32 and the lower surface 33 and forms an inner surface of the first frame 30.

The width of the lower surface 33 of the first frame 30 may be set to be smaller than the width of the upper surface 32. In this case, the upper surface 32 is in contact with the curved part 34, and the curved part 34 is extended to the straight part 35 and becomes in contact with the lower surface 33.

The curved part 34 and the straight part 35 of the first frame 30 may offset the difference in refractive index of light caused by the first frame 30, and thus the visual recognition of the dark part on the display panel 20 may be prevented. The curved part 34 is formed to be in contact with the upper surface 32, and the sectional shape of the curved part 34 may be, for example, circular or partially elliptical. Also, the straight part 35 connects the curved part 34 and the lower surface 33, and may be obliquely extended.

On the lower surface 33, the first fixing projection 31 may be formed. The region of the first frame 30 overlapping the bezel part 12 may be formed of an opaque material, and the region of the first frame 30 overlapping the display area may be formed of a transparent material. The width of the upper surface 32 of the first frame 30 may be smaller than the width of the upper surface of the second frame 60.

In addition, between the upper receptacle 10 and the display panel 20, a buffering member 15 that protects the display panel 20 and prevents light leakage may be interposed. The buffering member 15 may be formed of an elastic material to protect the display panel 20 from the metallic upper receptacle 10. The buffering member 15 may be formed along the bezel part 12 of the upper receptacle 10, and may be made of an opaque material.

Figure 7:
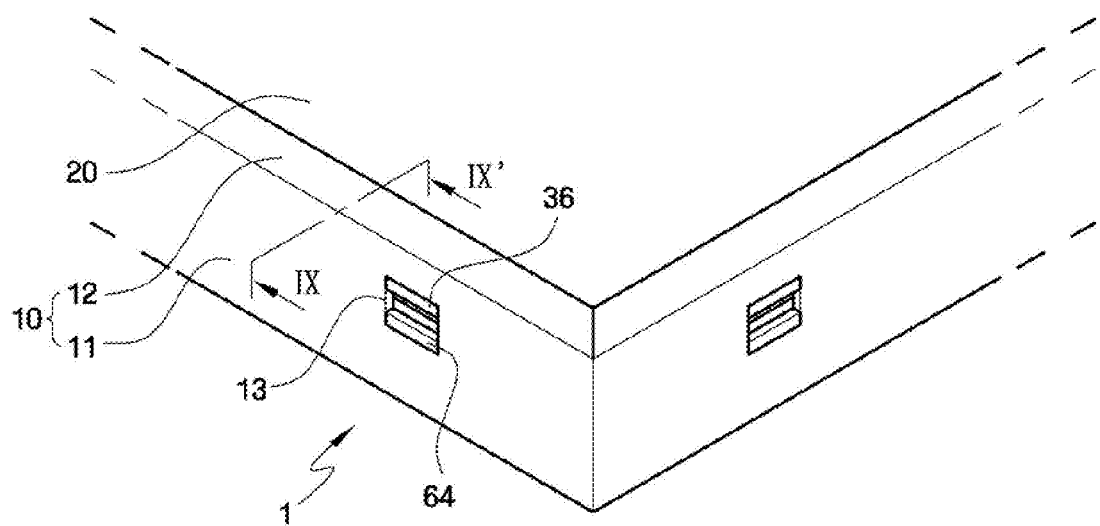
FIG. 7 is a partial perspective view of a display device according to a second embodiment of the present invention.
Figure 8:
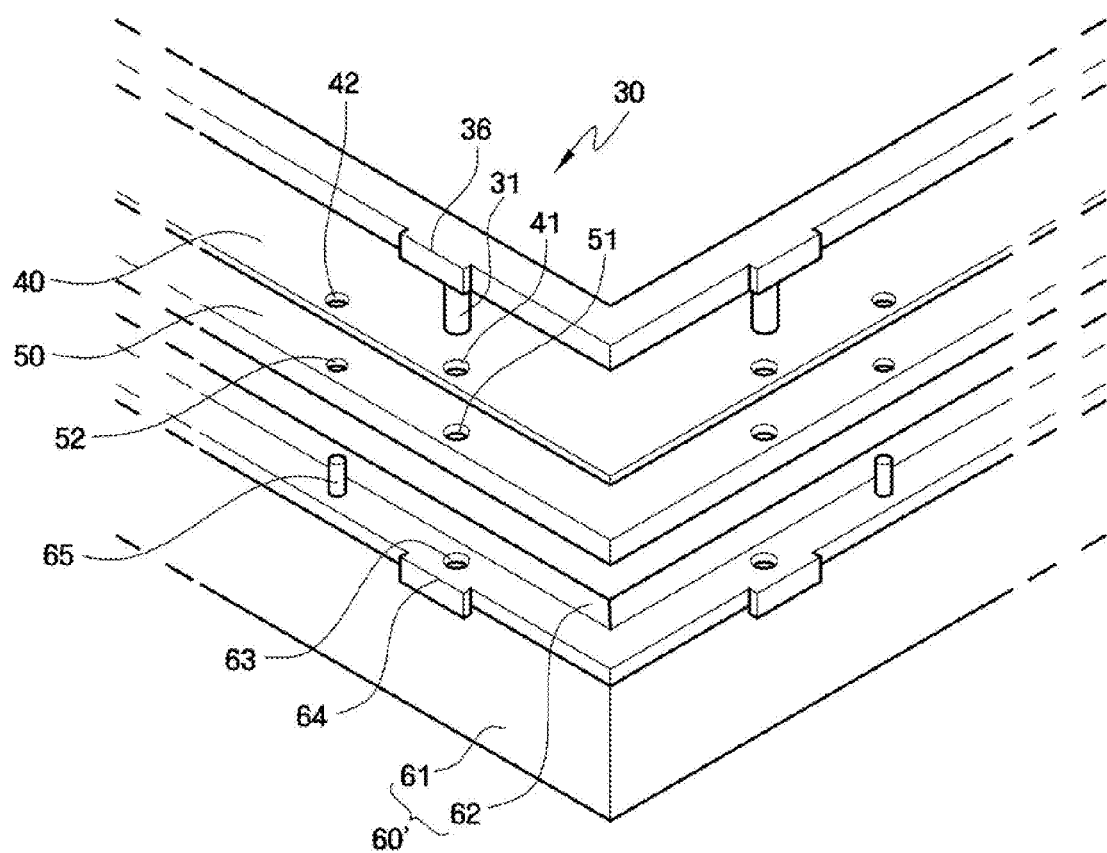
FIG. 8 is a partial exploded perspective view explaining engagement of a first frame and a second frame included in the display device of FIG. 7 in accordance with an embodiment.
Figure 9:
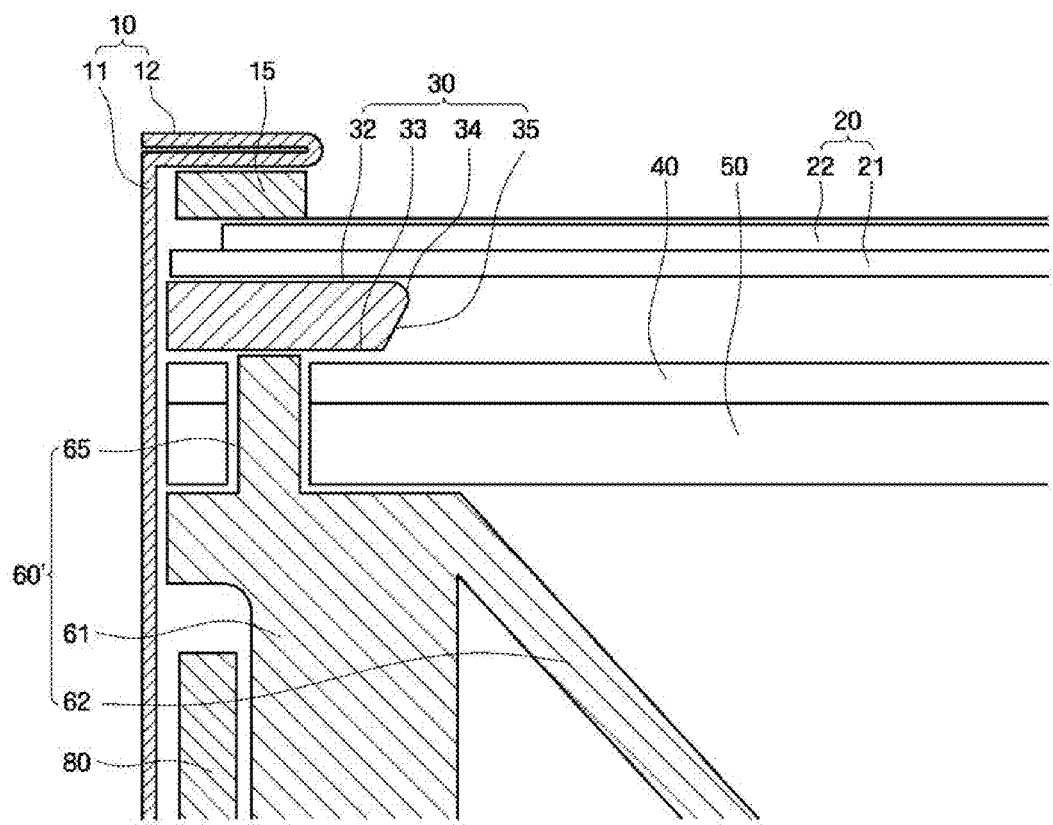
FIG. 9 is a sectional view of the display device, taken along line IX-IX' in FIG. 7 in accordance with an embodiment.

Hereinafter, with reference to FIGS. 7 to 9, a display device according to a second embodiment of the present invention will be described. FIG. 7 is a partial perspective view of a display device according to a second embodiment of the present invention. FIG. 8 is a partial exploded perspective view, in accordance with an embodiment, explaining engagement of a first frame and a second frame included in the display device of FIG. 7, and FIG. 9 is a sectional view, in accordance with an embodiment, of the display device, taken along line IX-IX' in FIG. 7. For convenience in explanation, the same drawing reference numerals are used for the same elements as the first embodiment, and the detailed description thereof will be omitted.

A display device 1 according to the second embodiment of the present invention includes a second fixing projection 65 formed on the second frame 60' to facilitate the assembling of the optical sheet 40 and the diffusion plate 50.

The first frame 30 forms seating surfaces of the display panel 20. The first frame 30 includes the first fixing projection 31, and fixes the optical sheet 40 and the diffusion plate 50. The first frame 30 may be in the form of a tetragon having an open center part that forms an inner side surface thereof so that the first frame 30 overlaps the edge of the display panel 20. The first frame 30 includes the first fixing projection 31 formed on the lower part thereof. The first fixing projection 31 penetrates the first hole 41 formed on the optical sheet 40 and the second hole 51 formed on the diffusion plate 50, and is inserted into a fixing hole 63 of the second frame 60'. The first fixing projection 31 serves to fix the first frame 30 and the second frame 60' to each other, and to fix the optical sheet 40 and the diffusion sheet 50 to the second frame 60'. A plurality of first fixing projections 31 may be formed along the four sides of the first frame 30.

On the second frame 60', the fixing hole 63, which is engaged with the first fixing projection 31, and the second fixing projection 65 are formed. The second fixing projection 65 enables the optical sheet 40 and the diffusion plate 50 to be easily fixed to the second frame 60'.

In the process of assembling the optical sheet 40 and the diffusion plate 50, the optical sheet 40 and the diffusion plate 50 may be seated on the second frame 60', and the first frame 30 may be moved above parts of the optical sheet 40 and the diffusion plate 50 to assemble the optical sheet 40 and the diffusion plate 50. If there is no structure capable of fixing the optical sheet 40 and the diffusion plate 50 on the second frame 60', it may not be easy to arrange the optical sheet 40 and the diffusion plate 50 so that the first hole 41 of the optical sheet 40 and the second hole 51 of the diffusion plate 50 coincide with each other. Accordingly, in order to easily arrange the optical sheet 40 and the diffusion plate 50 on the second frame 60', the second fixing projection 65 may be formed on the second frame 60'.

The second frame 60' includes four wall surfaces 61 and inclined surfaces 62 extended from the four wall surfaces 61. Second fixing projections 65 may be formed on the four wall surfaces 61. The height of the second fixing projection 65 may be adjusted in consideration of the thicknesses of the diffusion plate 50 and the optical sheet 40. Since it is not necessary for the second fixing projection 65 to fix the first frame 30 and the second frame 60', the height of the second fixing projection 65 may be set to be somewhat higher than the thickness of the diffusion plate 50.

The second fixing projection 65 may be formed to overlap the bezel part 12 of the upper receptacle 10. In other words, to prevent the second fixing projection 65 from being visually recognized on the display panel 20, it may be formed in the non-display area of the display panel 20.

The second fixing projection 65 may be formed in a body (e.g., integrally) with the second frame 60'. The shape of the second fixing projection 65 is not, however, limited thereto, and the second fixing projection 65 and the second frame 60' may be separately formed and then engaged with each other. For example, in order to prevent the second fixing projection 65 from being visually recognized on the display panel 20, it may be formed of a transparent material, and then may be fixed to the second frame 60'. Also, in order to form the second fixing projection 65 with a transparent structure, an insert molding method may be used so that only the second fixing projection 65 is formed by inserting a transparent material, and the remaining part is formed in mold.

On the optical sheet 40 and the diffusion plate 50, a third hole 42 and a fourth hole 52, into which the second fixing projections 65 may be inserted, may be formed. In the same manner as the first hole 41 and the second hole 51, the third hole 42 and the fourth hole 52 may be formed at edges of the optical sheet 40 and the diffusion plate 50. The diameter of the third hole 42 and the fourth hole 52 may be smaller than the diameter of the first hole 41 and the second hole 51.

Figure 10:
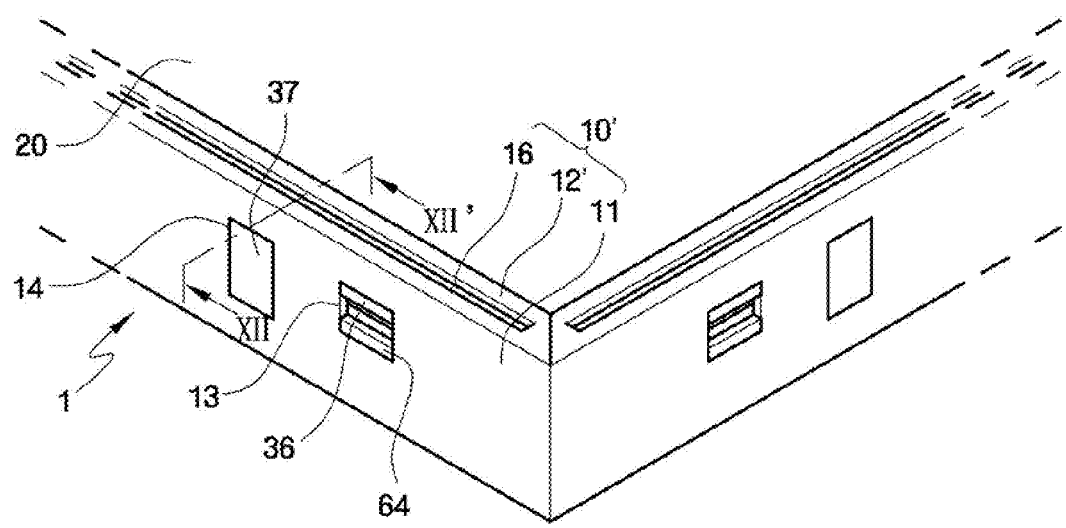
FIG. 10 is a partial perspective view of a display device according to a third embodiment of the present invention.
Figure 11:
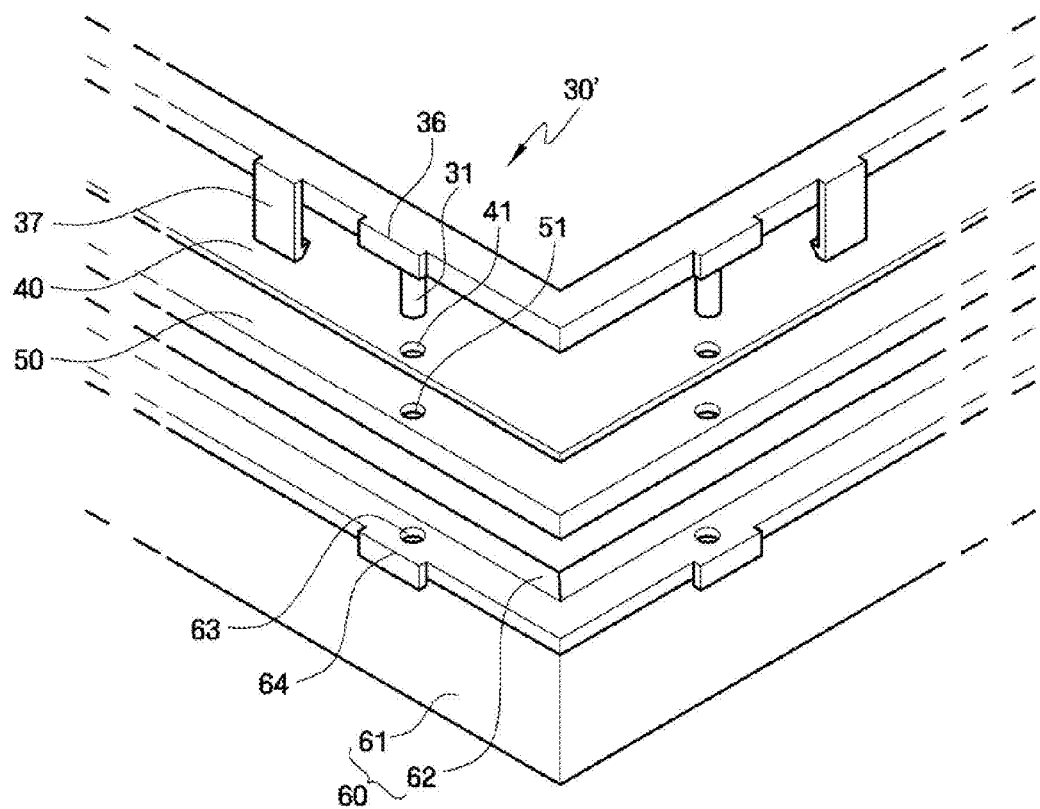
FIG. 11 is a partial exploded perspective view explaining engagement of a first frame and a second frame included in the display device of FIG. 10 in accordance with an embodiment.
Figure 12:
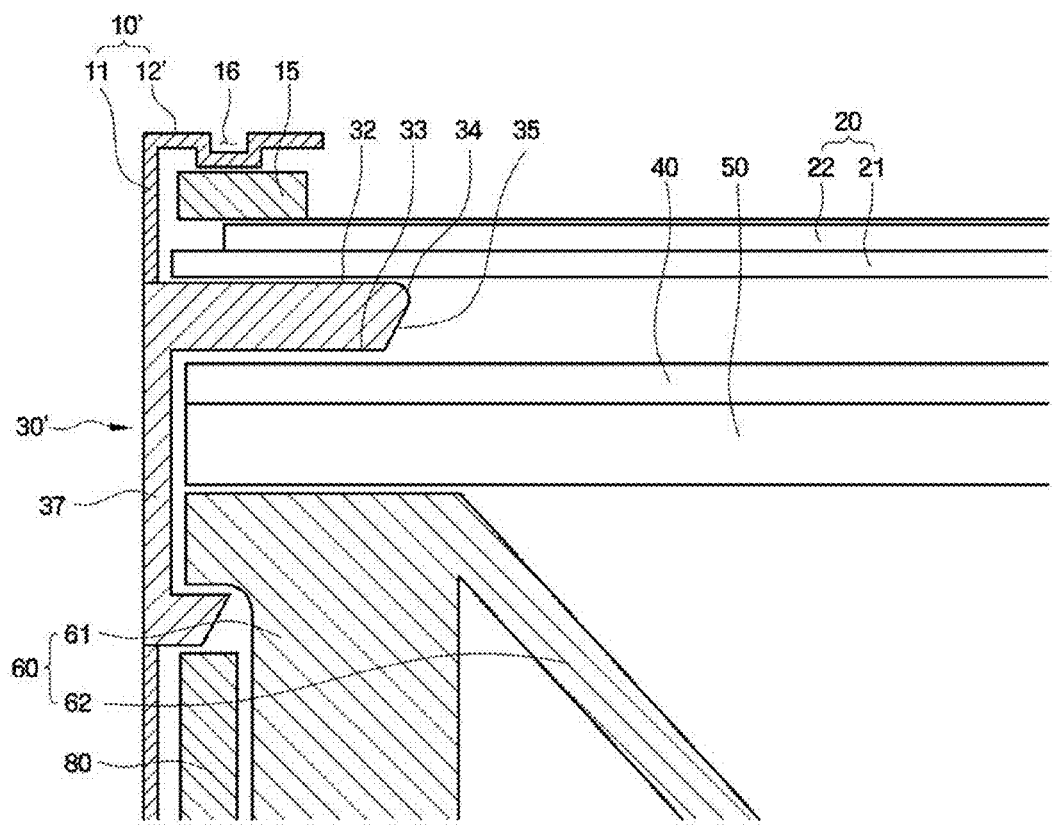
FIG. 12 is a sectional view of the display device, taken along line XII-XII' in FIG. 10.

Hereinafter, with reference to FIGS. 10 to 12, a display device according to a third embodiment of the present invention will be described in detail. FIG. 10 is a partial perspective view of a display device according to a third embodiment of the present invention, FIG. 11 is a partial exploded perspective view, in accordance with an embodiment, explaining engagement of a first frame and a second frame included in the display device of FIG. 10, and FIG. 12 is a sectional view, in accordance with an embodiment, of the display device, taken along line XII-XII' in FIG. 10. For convenience in explanation, the same drawing reference numerals are used for the same elements as the first embodiment, and the detailed description thereof will be omitted.

A display device 1 according to the third embodiment of the present invention includes a reinforcement part 16 reinforcing the stiffness of the bezel part 12' of the upper receptacle 10', and the first frame 30' and the second frame 60 are in hook engagement with each other.

The first frame 30' forms seating surfaces of the display panel 20. The first frame 30' includes the first fixing projection 31, and fixes the optical sheet 40 and the diffusion plate 50. The first frame 30' may be in the form of a tetragon having an open center part that forms an inner side surface thereof so that the first frame 30' overlaps the edge of the display panel 20. The first frame 30' includes the first fixing projection 31 formed on the lower part thereof. The first fixing projection 31 penetrates the first hole 41 formed on the optical sheet 40 and the second hole 51 formed on the diffusion plate 50, and is inserted into a fixing hole 63 of the second frame 60. The first fixing projection 31 serves to fix the first frame 30' and the second frame 60 to each other, and to fix the optical sheet 40 and the diffusion sheet 50 to the second frame 60. A plurality of first fixing projections 31 may be formed along the four sides of the first frame 30'.

The first frame 30' includes a hook member 37 for hook engagement with the second frame 60. The first frame 30' and the second frame 60 may be engaged with each other through the first fixing projection 31 and the fixing hole 63. In order to reinforce the engagement force of the first frame 30' and the second frame 60, the first frame 30' includes the hook member 37. The hook member 37, which is in the form of a hook, is formed on the outside of the first frame 30'. The hook member 37 may be hook-engaged with one end part of the second frame 60. The second frame 60 includes four wall surfaces 61 and inclined surfaces 62 extended from the four wall surfaces 61.

In addition, on the side-wall part 11 of the upper receptacle 10', a second opening 14 is formed. The second opening 14 exposes at least a part of the hook member 37 of the first frame 30'. Since at least a part of the hook member 37 is exposed, a space provided on the inside of the upper receptacle 10' is reduced, and thus the width of the bezel part 12' of the upper receptacle 10' may be reduced. The hook member 37 and upper receptacle 10' may be formed so that the hook member 37 is not exposed to an outside through the side-wall part 11 of the upper receptacle 10'.

The bezel part 12' of the upper receptacle 10' includes a reinforcement part 16 for reinforcing the stiffness. The reinforcement part 16 may be formed by making the surface of the bezel part 12' curved downward. That is, the reinforcement part may be in the form of a furrow that is in parallel to the bezel part 12'. By forming the reinforcement part in the form of a furrow on the bezel part 12', a narrow and strong bezel part 12' may be provided. The shape of the reinforcement part 16 is not, however, limited thereto, and the reinforcement part 16 may also be formed by making a part of the bezel part 12' project upward in parallel to the side-wall part 11.

Figure 13:
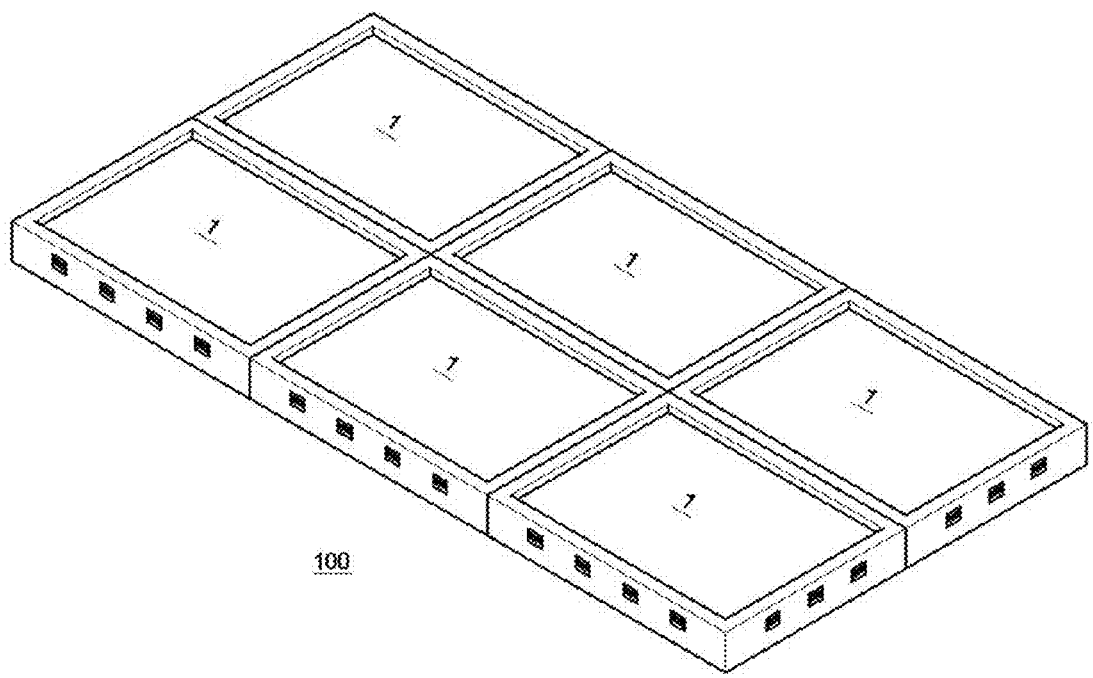
FIG. 13 is a perspective view of a multi-display device according to an embodiment of the present invention including display devices according to one or more embodiments of the present invention.

Hereinafter, with reference to FIG. 13, a multi-display device provided by connecting a plurality of display devices according to an embodiment of the present invention will be described in detail. FIG. 13 is a perspective view of a multi-display device according to an embodiment including display devices according to one or more embodiments of the present invention.

Referring to FIGS. 1 and 13, a multi-display device 100 is formed by joining a plurality of display devices 1 in the form of a matrix. The multi-display device 100 includes all display screens of the display devices 1, and thus is provided with a large-area screen. In this case, each display device 1 forms a unit display device, and the respective bezel parts 12 of the display devices 1 form non-display regions on the large-area screen. Since the bezel parts 12 of the respective display devices 1 may be visually recognized on the large-area screen, there is a need for a structure that can minimize the size of the bezel part 12.

Although some embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A display device comprising:
a display panel to display an image;
a first frame having a first surface configured to support the display panel and a second surface on which a first coupling mechanism is formed;
a second frame having a second coupling mechanism and engaged with the first frame;
an optical member interposed between the first frame and the second frame; and
a receptacle including four side-wall parts and a bezel part extended from the side-wall parts to an inside thereof, and receiving the display panel, the first frame, and the second frame therein,
wherein the first coupling mechanism and the second coupling mechanism comprise a plurality of fixing projections and a plurality of fixing holes, respectively, wherein the plurality of the fixing projections are inserted into the fixing holes.

2. The display device of claim 1, wherein the display panel includes a display area where the image is displayed and a non-display area where no image is displayed, and
wherein at least a part of the first frame overlaps the display area.

3. The display device of claim 2, wherein a width of the bezel part is smaller than a width of the upper surface of the first frame.

4. The display device of claim 2, wherein at least a part of the first frame is formed of a transparent material.

5. The display device of claim 4, wherein a width of the bezel part is smaller than a width of the upper surface of the first frame.

6. The display device of claim 4, wherein an area of the first frame that overlaps the display area is formed of a transparent material.

7. The display device of claim 6, wherein a width of the bezel part is smaller than a width of the upper surface of the first frame.

8. The display device of claim 1, wherein the display panel, the first frame, the second frame, the optical member, and the receptacle form a unit display device, and a plurality of unit display devices are adjacently arranged.

9. The display device of claim 1, wherein at least a part of the first frame is formed of a transparent material.

10. The display device of claim 9, wherein an area of the first frame that overlaps the display area is formed of a transparent material.

11. The display device of claim 9, wherein a width of the bezel part is smaller than a width of the upper surface of the first frame.

12. The display device of claim 11, wherein an area of the first frame that overlaps the display area is formed of a transparent material.

13. A display device comprising:
a display panel to display an image;
a first frame extending along a side of the display panel and having first fixing projections and an upper surface on which the display panel is seated;
a second frame engaged with the first frame;
an optical member interposed between the first frame and the second frame, and having holes into which the first fixing projections are inserted; and
a receptacle including four side-wall parts and a bezel part extended from the side-wall parts to an inside thereof, and receiving the display panel, the first frame, and the second frame therein,
wherein the second frame comprises first fixing holes into which the first fixing projections are inserted.

14. The display device of claim 13, wherein the display panel includes a display area where the image is displayed and a non-display area where no image is displayed, and
wherein at least a part of the first frame overlaps the display area.

15. The display device of claim 14, wherein a width of the bezel part is smaller than a width of the upper surface of the first frame.

16. The display device of claim 14, wherein at least a part of the first frame is formed of a transparent material.

17. The display device of claim 16, wherein an area of the first frame that overlaps the display area is formed of a transparent material.

18. The display device of claim 17, wherein a width of the bezel part is smaller than a width of the upper surface of the first frame.

19. The display device of claim 16, wherein a width of the bezel part is smaller than a width of the upper surface of the first frame.

20. The display device of claim 13, wherein at least a part of the first frame is formed of a transparent material.

21. The display device of claim 20, wherein an area of the first frame that overlaps the display area is formed of a transparent material.

22. The display device of claim 20, wherein a width of the bezel part is smaller than a width of the upper surface of the first frame.

23. The display device of claim 22, wherein an area of the first frame that overlaps the display area is formed of a transparent material.

24. The display device of claim 13, wherein a width of the bezel part is smaller than a width of the upper surface of the first frame.

25. A display device comprising:
a display panel to display an image;
a first frame extending along a side of the display panel and having first fixing projections and an upper surface on which the display panel is seated;
a second frame having second fixing projections and engaged with the first frame;
an optical member interposed between the first frame and the second frame, and having holes into which the second fixing projections are inserted; and a receptacle including four side-wall parts and a bezel part extended from the side-wall parts to an inside thereof, and receiving the display panel, the first frame, and the second frame therein, wherein the second frame comprises second fixing holes into which the first fixing projections are inserted.

26. The display device of claim 25, wherein the display panel includes a display area where the image is displayed and a non-display area where no image is displayed, and wherein at least a part of the first frame overlaps the display area.

27. The display device of claim 26, wherein at least a part of the first frame is formed of a transparent material.

28. The display device of claim 27, wherein an area of the first frame that overlaps the display area is formed of a transparent material.

29. The display device of claim 28, wherein a width of the bezel part is Smaller than a width of the upper surface of the first frame.

30. The display device of claim 29, wherein a width of the bezel part is smaller than a width of the upper surface of the first frame.

31. The display device of claim 26, wherein a width of the bezel part is smaller than a width of the upper surface of the first frame.

32. The display device of claim 25, wherein a width of the bezel part is smaller than a width of the upper surface of the first frame.

33. The display device of claim 25, wherein at least a part of the first frame is formed of a transparent material.

34. The display device of claim 33, wherein an area of the first frame that overlaps the display area is formed of a transparent material.

35. The display device of claim 33, wherein a width of the bezel part is smaller than a width of the upper surface of the first frame.

36. The display device of claim 35, wherein an area of the first frame that overlaps the display area is formed of a transparent material.

* * * * *